US008179427B2

(12) United States Patent
Nemeth

(10) Patent No.: US 8,179,427 B2
(45) Date of Patent: May 15, 2012

(54) OPTICAL FILTER DEVICES AND METHODS FOR PASSING ONE OF TWO ORTHOGONALLY POLARIZED IMAGES

(75) Inventor: Edward Allen Nemeth, Hermosa Beach, CA (US)

(73) Assignee: Disney Enterprises, Inc., Burbank, CA (US)

( * ) Notice: Subject to any disclaimer, the term of this patent is extended or adjusted under 35 U.S.C. 154(b) by 623 days.

(21) Appl. No.: 12/399,162

(22) Filed: Mar. 6, 2009

(65) Prior Publication Data
US 2010/0225751 A1 Sep. 9, 2010

(51) Int. Cl.
*H04N 13/04* (2006.01)
(52) U.S. Cl. .......................... 348/58; 348/564
(58) Field of Classification Search .............. 348/54, 348/58, 53, 564; 353/7, 84; 396/324
See application file for complete search history.

(56) References Cited

U.S. PATENT DOCUMENTS

| 4,562,463 | A | 12/1985 | Lipton |
| 4,792,850 | A | 12/1988 | Liptoh et al. |
| 5,483,254 | A | 1/1996 | Powell |
| 6,259,865 | B1 | 7/2001 | Burke et al. |
| 6,943,852 | B2 | 9/2005 | Divelbiss et al. |
| 7,616,885 | B2 * | 11/2009 | Chen et al. ................ 396/324 |
| 2002/0101546 | A1 | 8/2002 | Sharp et al. |
| 2005/0039210 | A1 | 2/2005 | Dusenberry et al. |
| 2006/0174266 | A1 | 8/2006 | Gatto et al. |
| 2007/0015464 | A1 | 1/2007 | Disalvo |
| 2007/0055989 | A1 | 3/2007 | Shanks et al. |
| 2007/0103558 | A1 | 5/2007 | Cai et al. |
| 2007/0139519 | A1 * | 6/2007 | DeCusatis et al. ............ 348/58 |
| 2007/0139624 | A1 * | 6/2007 | DeCusatis et al. ............ 353/84 |
| 2007/0182812 | A1 | 8/2007 | Ritchey |
| 2007/0240190 | A1 | 10/2007 | Arseneau et al. |
| 2007/0266412 | A1 | 11/2007 | Trowbridge et al. |
| 2008/0052746 | A1 | 2/2008 | Cooper et al. |
| 2008/0055546 | A1 * | 3/2008 | DeCusatis et al. ............. 353/7 |
| 2009/0322861 | A1 * | 12/2009 | Jacobs et al. ................. 348/53 |
| 2010/0013911 | A1 * | 1/2010 | Jacobs et al. ................. 348/54 |
| 2010/0079585 | A1 * | 4/2010 | Nemeth et al. ............... 348/54 |

* cited by examiner

*Primary Examiner* — Jungwon Chang
(74) *Attorney, Agent, or Firm* — Marsh Fischmann & Breyfogle LLP; Kent A. Lembke

(57) ABSTRACT

Shutter glasses or other viewing mechanisms for selectively passing one separable image in a composite image stream, which includes a first image stream polarized at a first orientation and a second image stream polarized at a second orthogonal orientation. The apparatus includes a first switchable optical rotator that receives the composite image stream and rotates the first and second image streams by 90 degrees or passes them unchanged. A first polarization filter is placed adjacent to the first optical rotator and is aligned to pass the first image stream when the first optical rotator rotates the image streams and to pass the second image stream when the images are passed without rotation. The apparatus includes a second switchable optical rotator that selectively rotates the image stream to choose a time slot for viewing, and a second polarization filter passes image streams at the first or second orientation to a viewer.

19 Claims, 11 Drawing Sheets

OPTICAL FILTER DEVICES AND METHODS FOR PASSING ONE OF TWO ORTHOGONALLY POLARIZED IMAGES

BACKGROUND OF THE INVENTION

1. Field of the Invention

The present invention relates, in general, to methods and devices for selectively passing image streams to a viewer of projected images, and, more particularly, to shuttered glasses or other optical filter devices that increase the number of video streams, e.g., two dimensional (2D) or three dimensional image streams, that may be viewed by a user of the shuttered glasses or other optical filter devices.

2. Relevant Background

Technologies presently exist that allow for multiple video or image streams to be broadcast or displayed on a single display or screen. For example, multiple image streams may be provided by projecting time multiplexed images onto a display screen and then synchronizing shuttered glasses to the time sequence corresponding to the frames displaying the desired image (e.g., the image to be seen at a particular time through the shuttered glasses). Glasses that can shutter at up to 300 Hertz are currently available and can be used to view at least three separate three dimensional (3D) streams or up to at least six separate two dimensional (2D) streams that are projected or displayed onto the same screen.

In most applications, multiple stream projection is used either to create a 3D effect (e.g., shuttering to control left and right eye images viewed by a person wearing the shuttered glasses) or to support multiple players in a video game environment. In the latter application, each player wears shuttered glasses that operate at a frequency such that they view an image stream associated with their player view such that split screen views are not required. For example, Player A and Player B using a video game system each wear glasses set to operate at differing frequencies such that they view a Player A video stream and a Player B video stream, respectively, as it is displayed in an alternating (or time multiplexed fashion) on the entire monitor or television screen.

In more recent developments, multiple video streams are projected on a display surface and each viewer or subsets of viewers are able to choose which video stream is viewed by modifying the shuttered glasses or other optical filters. For example, shuttered glasses may be provided to each of the audience members and two or more video streams projected on a theater screen. The shuttered glasses include a switching capability that allows them to be operated at two or more operating states (e.g., frequencies, polarization state of the polarized filter, or the like) to synchronize shuttering to view any of the projected video streams. In some cases, a guest controlled action or audience member input ("user input") is used to determine when to switch the shuttered glasses to a different operational state and to allow the audience member wearing the glasses to view a different video stream corresponding to the new operational state. In other cases, the switching may be controlled remotely based on the user input (e.g., audience members that lean left see a different image than those that lean right) or to achieve a desired effect (e.g., switching portions of the audience's optical filters or glasses to view differing streams during the particular event or game). Generally, the switching is immediate upon receipt of user input (or controller commands) to provide improved responsiveness and to increase the audience member's perception that they controlled the displayed image, but, in some cases, the response may be delayed such as to wait until a branch in a storyline or the like.

With the growing use of multi-viewer systems, there is a demand for more and more views or image streams to be available for viewing, e.g., more than the typically available three 3D image streams or six 2D image streams. In a multi-viewer system, the capabilities of the system may be limited and/or defined by the number of separable images or image streams. The number of separable images, for example, determines the number of different views, branches, and interpositional steps that can be reproduced for individual viewers. To improve the capabilities of the multi-viewer system, there is a demand to increase the number of separable images.

In an active multi-viewer system (e.g., a system using time-synchronized shutter glasses), each frame is divided into time slots with a single image displayed in each time slot. The number of time slots and, therefore, images is limited by the response time of the shutter glasses (e.g., the shutter rate technology) and the desired projection frame rate. Further, simply increasing the shuttering frequencies to display more images may have limitations as this may result in the viewer seeing or sensing ghosting of sequentially displayed images (e.g., the left eye image may bleed into the right eye image viewing, a first 2D image stream may ghost into a second 2D image stream and so on). Within a single projection frame, time slots are defined for each separable image, and the shutter glasses must "open" and "close" in synchronization with the desired image. In the case of 3D systems, images are created by displaying the image for the left eye and the image for the right eye in different time slots and synchronizing the lenses of the shutter glasses with the time slot appropriate for each eye. Therefore, two time slots are needed to produce a single 3D image.

To better understand limitations on the number of separable images or image streams, it may be useful to look further at existing shutter glasses such as conventional liquid crystal display (LCD) shutter glasses. FIG. 1 illustrates an image stream 100 that may be used to present multiple image streams to viewers or audience members wearing shuttered glasses. Using the video or image stream 100, a set of images 112, 114, 116 are projected in a first frame 110 and a different set of images 122, 124, 126 are provided in a second frame 120. For example, a shuttered video projector (or three shuttered video projectors) may be used to provide three differing video streams or separable images on a single display, with viewers using their synchronized shutter glasses to view one of the images (e.g., one viewer may view Image 1 by viewing only images 112, 122 in successive frames while another viewer may view Image 3 by viewing only images 116, 126 in successive frames). Multiple images are projected or displayed in stream 100 for each frame 110, 120 with individual images separated by displaying each image only during a specific time slot within the time frame 110, 120 (e.g., images 112, 122 associated with Image 1 are only displayed during the first sub-frame time slot of each frame 110, 120). As shown, one image is displayed or provided in the stream 100 in each time slot of the frames 110, 120. The number of time slots and, therefore, the number of separable images is limited by the response times of the display system and the viewing mechanism such as LCD shutter glasses or other optical filter. Typically, only two time slots are used in a stream rather than the three shown in FIG. 1, but research suggests that up to six time slots may be feasible in each frame 110, 120 with existing projection and viewing technologies. However, there are proposed uses of image streams with up to 6 to 12 or more separable images. Hence, existing technology is not able to meet increasing demands for more and more separable images (or time slots per frame).

Regarding separation of these displayed or projected images, an individual image is presented to each viewer in conventional viewing mechanisms by providing a switchable optical shutter that is synchronized to open only during the time slot corresponding to the desired image. For example, LCD shutter glasses may be used, and these devices typically include a pair of lenses containing liquid crystal and a pair of polarizing filters. Each lens may be adapted to become dark when voltage is applied but otherwise be transparent (or vice versa). FIG. 2 illustrates one multi-image viewing/display system 200 (such as may be used in a theater, a video game setting, or the like) using LCD shutter glasses 230 to view one of a number of separable images. An image source 210 is used to provide an image stream 220 to the LCD shutter glasses 230, which would be worn by each viewer or member of an audience. The image source 210 may be a monitor or display surface upon which a projector, a computer video system, or the like may provide a stream of image frames with two or more image streams (such as shown in FIG. 1).

The light or image stream 220 from the image source 210 is shown to be unpolarized light. The LCD shutter glasses 230 include two lenses in this example with each being formed with a switchable optical rotator (i.e., the liquid crystal portion) 234, 242 sandwiched between a pair of polarized filters 232, 236, 240, 244. In the illustrated system 200, the LCD shutter glasses 230 are in an operating state with the optical filter 242 associated with the left eye energized such that the left lens is dark and no light passes to the left eye as shown at 245. Different operating states are created by selectively energizing one or both of the optical rotators 234, 242 to allow light to pass to the viewer's eyes 238, 246, and, in this manner, the viewer is able to see only one of multiple images provided in a particular frame (e.g., images associated with a particular time slot of each sequential time frame).

As shown in FIG. 2, light 220 passes through a first polarization filter 232, 240 in each lens to create polarized light 233, 241. Then, the light 233, 241 next passes through a switchable optical rotator 234, 242. Typically, the optical rotator 234, 242 is made up of a twisted nematic liquid crystal, and in use, if the switchable optical rotator 234, 242 is energized as shown for rotator 242 the light 243 passes without rotation. If the switchable optical rotator 234, 242 is not energized as shown for rotator 234, the polarized light 235 is rotated by 90 degrees as it is passed through the rotator 234. Therefore, after passing through the first polarization filter 232 or 240 and the switchable optical rotator 234 or 242, the light 235, 243 is polarized in one of two orthogonal orientations, with the orientation depending on whether or not the switchable optical rotator 234, 242 is energized (e.g., by voltage selectively provided by a power source operated by a controller to synchronize shuttering with an image stream provided via image source 210).

The light 235, 243 then encounters a second polarization filter 236, 244 that is aligned with one of the two orthogonal polarization axes created by passing through the first polarization filter 232, 240 and the switchable rotator 234, 244. If the light 235 incident on the second polarization filter 236 is aligned with the polarization axis of the filter the light 237 is passed through the LCD shutter glass lens (here to the right eye). If the light 243 incident on the second polarization filter 244 is orthogonal to the polarization axis of the filter the light is blocked, as shown at 245 for the left eye of the viewer. Selection between 2D images is accomplished through use of the LCD shutter glasses 230 by synchronizing the switchable optical rotators 234 and 242 such that the left and right eye shutters or lenses are synchronized with the same time slot of an image stream frame (again, see FIG. 1, for examples of multiple images being projected in each time frame). If the stream 220 is used to present 3D images, selection between 3D images is accomplished by synchronizing the switchable optical rotator 234, 242 such that the left and right eye shutters are synchronized with different time slots within a time frame. For example, as shown in FIG. 2, one image 237 may represent the image for the right eye 238 that is presented in a first time slot and one image 245 may represent the image for the left eye 246 in a second time slot.

The number of different images that can be presented to a viewer depends on the number of time slots available in each frame of a video stream, with one time slot being needed for each 2D image and two times slots being needed for each 3D image. For example, a video stream may include frames that each includes six time slots (e.g., an upper limit typically believed achievable with existing viewing mechanisms such as LCD shutter glasses and the like). In this case, the number of separable images or image streams that could be represented is up to six 2D images (i.e., 6 time slots/1 time slot per image=6 images) and up to three 3D images (i.e., 6 time slots/2 time slots per image=3 images).

Hence, there remains a need for improved methods and devices for allowing larger numbers of separable images or image streams to be presented to viewers. Preferably, such methods and devices would allow viewers to view one of many separable images projected or displayed in a multi-viewer theatre or other application or in a multi-player video game. Such applications may be designed for presenting more than three 3D images, and, more particularly, may be designed for presenting more than six 2D images or image streams to viewers.

SUMMARY OF THE INVENTION

The present invention addresses the above problems by providing methods and systems for selectively displaying one of a set of multiple images or image streams. The display techniques may be thought of as involving creating a pair of time-multiplexed image streams that are displayed concurrently on a display device or surface. This provides a composite image stream in which the display for each time slot includes two images instead of just one, and, significantly, each of the time-multiplexed images is polarized (e.g., at first and second polarization orientations) such that in each pair of images in a time slot one image is polarized with an orientation that is orthogonal to the other image. The display techniques further include adding a viewing mechanism or optical filter that is capable of selectively passing one of the two orthogonally polarized images. Such a mechanism may be constructed to pass light through an optical rotation layer and then through a polarization filter, such as a polarization filter found in conventional shutter glasses. The display technique may further include combining the optical rotation layer/polarization filter with shutter glass technology (e.g., LCD shutter glasses or the like) such that either of two projected images (e.g., either of a pair of images in a composite image) may be selectively passed per time slot. In this manner, the number of images available for viewing is doubled for a given time-multiplexed image stream (i.e., for a particular number of time slots used to present separable images the number of images is doubled due to the presentation of two streams in the composite image stream). In some multi-viewer applications, the display techniques described herein double both the number of 3D images and the number of 2D images that can be produced for a given number of time slots (e.g., if 4 time slots are included in each time frame, 8 images are available for viewing instead of only 4 images as is the case with conventional projection and shutter glass systems).

More particularly, a method is provided for allowing members of an audience to view differing image streams such as to view particular 2D or 3D images associated with time slots in a multiplexed image stream. The method includes positioning optical filters between a display surface and members of the audience in a viewing area. A composite image stream is provided or projected upon the display surface, and the composite image stream includes a first image stream having a first polarization orientation and a second image stream having a second polarization orientation. The method also includes operating a set of the optical filters in an operating state so as to block or filter one of the first and second images streams based on polarization orientation (i.e., to pass the other one of the streams). The first polarization orientation is typically orthogonal to the second polarization orientation.

In some embodiments, the two image streams are displayed concurrently to form the composite image stream, and each stream includes separable images presented in time slots of sequentially presented frames. The optical filters may include LCD shutter glasses worn by the audience members with right and left eye lenses that each include a pair of polarized filters with differing orthogonal alignments and a pair of switchable optical rotators sandwiching one of the polarized filters. The optical rotators are selectively energized to rotate the image streams to selectively pass one of the image streams and also to pass one of the separable images (e.g., the images associated with a particular time slot) through to the audience members.

According to another aspect, an apparatus or viewing mechanism is provided for selectively viewing a set of images presented in a time slot of a time-multiplexed composite image stream. The composite image stream may include a first image stream polarized at a first orientation and a second image stream polarized at a second orientation orthogonal to the first orientation, with the first and second image streams being projected or provided concurrently on a display surface (e.g., with the time slots of the two streams coinciding and being like in number per frame). The apparatus includes a first switchable optical rotator that receives the composite image stream and, based on whether it is energized or not, acts to rotate the first and second image streams by 90 degrees or passes them unchanged. A first polarization filter is placed adjacent to the first optical rotator and is aligned to pass the first image stream when the first optical rotator rotates the image streams and to pass the second image stream when the images are passed without rotation. The apparatus further includes a second switchable optical rotator that selectively (based on whether it is energized) rotates the image stream passed through the first polarization filter. The apparatus further includes a second polarization filter aligned to pass image streams at the first or second orientation such that operation of the second optical rotator acts to select one of the time slots for viewing (e.g., the second optical rotator may be operated to only align an image stream with the second polarization filter to pass one time slot through to a viewer).

DETAILED DESCRIPTION OF THE PREFERRED EMBODIMENTS

Briefly, embodiments of the present invention are directed to optical filters or viewing mechanisms (such as shuttered glasses, visors, helmets, and the like) as well as methods and systems for facilitating display and viewing of multiple images that can be selectively viewed by viewers or audience members. According to embodiments described herein a composite video or image stream is generated that includes a first multiple image stream and a second multiple image stream, and the two image streams or image pairs within such streams are polarized to two differing orientations (e.g., images in the second stream are orthogonally polarized relative to the images in the first stream). In this manner, the number of separable images in the composite video stream may be doubled compared with a conventional multiple image stream having the same number of time slots per frame. To separate the paired images, optical filters may be provided that provide a pair of switchable optical rotators along with first and second polarize filters, with the first optical rotator acting to select one of the two paired (and polarized) image streams such as in response to a change in a filter's operating state (e.g., energize or de-energize the rotator). Then, shuttering techniques may be used to select one of the separable images (or time slots) within the selected image stream to present a particular image to a viewer or user of an optical filter (e.g., a pair of LCD shutter glasses with two switchable optical rotators).

Figure 3:
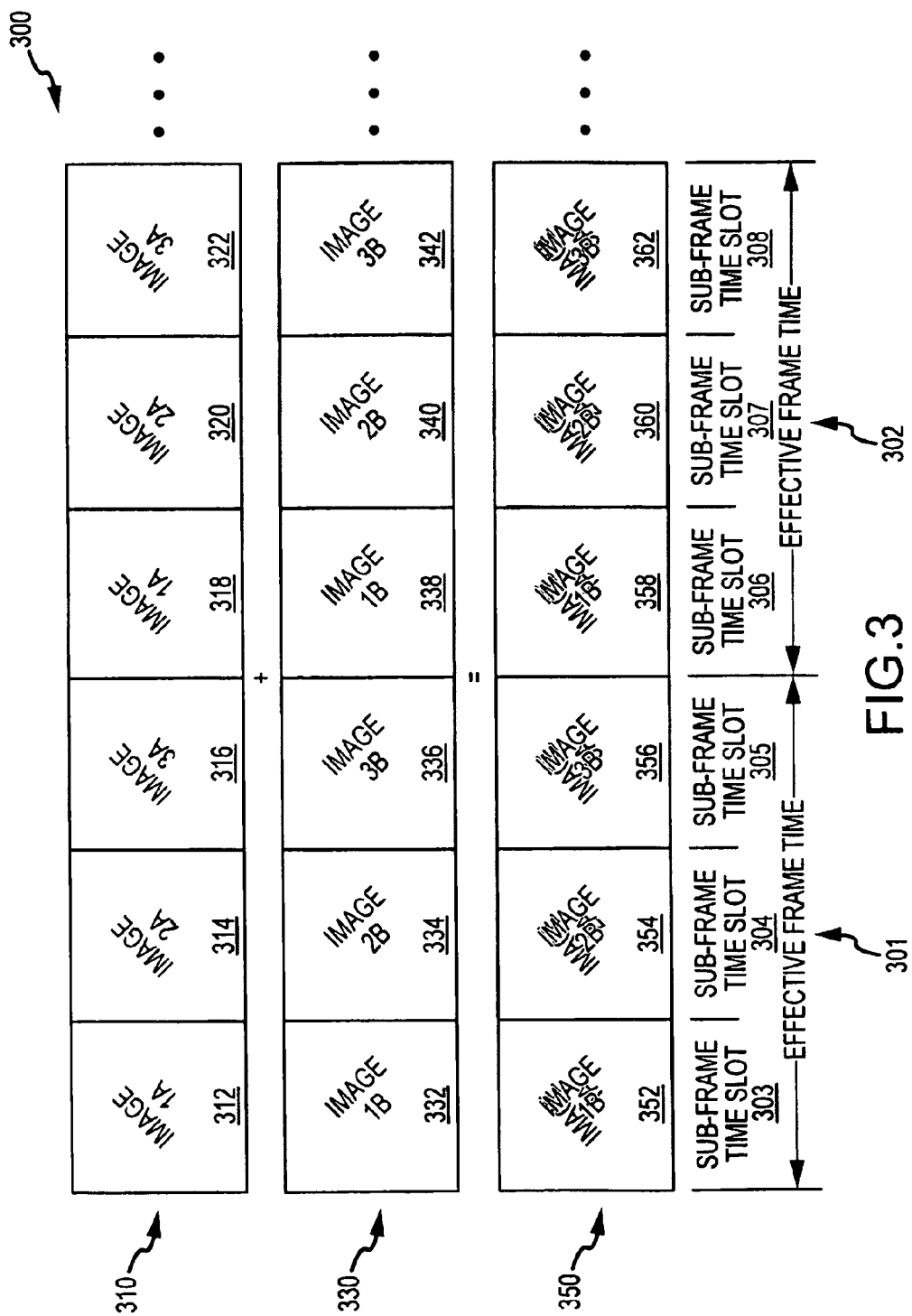
FIG. 3 illustrates a new image or video stream in accordance with an embodiment of the invention with first and second streams of separable images in which the streams are polarized at orientations that are rotated 90 degrees (e.g., the orientations of polarization are orthogonal for the two streams of images)

FIG. 3 illustrates a multiple image projection 300 in accordance with an embodiment of the invention that is used to produce a composite, multiple image video stream 350. The image source for the stream 350 is not limiting of the invention, but it may include a single projector using shuttering to provide a first stream 310 and a second stream 330 or may include a first projector and a second projector providing streams 310, 330 (e.g., digital video projectors with proper polarization filters on the projector outlets). In other cases, the image source may be a monitor or display that displays the image stream 350 (e.g., as part of a video game application). In this example, the video stream 350 includes sequential frames 301, 302 (or effective time frames), and each frame includes two or more time slots, with the illustrated stream including three sub-frame time slots 303-308 in each frame 301, 302. As discussed above, present shuttering techniques on LCD shutter glasses and so on typically limit the number of slots to less than six per frame, but this number may be increased in the future and the stream combination techniques described herein may be used to double the number of separable images in the stream 350 regardless of the number of time slots provided in the frames (e.g., if 3 are provided, the images can be doubled to 6 while if the number of slots were 8 the number of images would be doubled to 16 and so on in the case of 2D with the increase being less for 3D images as more time slots are required).

FIG. 3 illustrates presentation or projection 300 of images to viewers. Multiple image pairs are projected or displayed for each frame with individual image pairs separated by displaying each image pair only during a specific time slot within the time frame time. Significantly, two images are displayed during each time slot. This can be seen with streams 310 and 330 that are projected/displayed concurrently to form composite stream 350. In frame 301, image stream 310 includes three separable images 312, 314, 316 in time slots 303, 304, 305 while image stream 330 includes images 332, 334, 336 in these time slots. The separable images are combined in stream 350 as image pairs 352, 354, 356, 358, 360, 362 in the time slots 303-308 of the two frames 301, 302 illustrated in FIG. 3.

Each of image pairs 352-362 may be thought of as having an "a" image (312-322) that is polarized to some orientation (e.g., a first polarization orientation) and a "b" image (332-342) that is polarized at an orientation that is rotated 90 degrees relative to the "b" image (e.g., a second polarization orientation that is orthogonal to the first polarization orientation). The "a" and "b" images may be used to represent images for the left eye, the right eye, or both. The composite image stream 350 is provided on a single display surface or monitor screen to provide six 2D image streams or three 3D image streams. Viewers may use an optical filter or viewing mechanism with rotating, polarized shutters (e.g., LCD shutter glasses or the like) as described below to separate the images to view a particular image or image pair. For example, in a 2D application, a viewer may choose to show Image 2a, for example, to both the left and right eye by placing the optical filter in the proper operating state to filter or block the other five images of stream 350.

Figure 4:
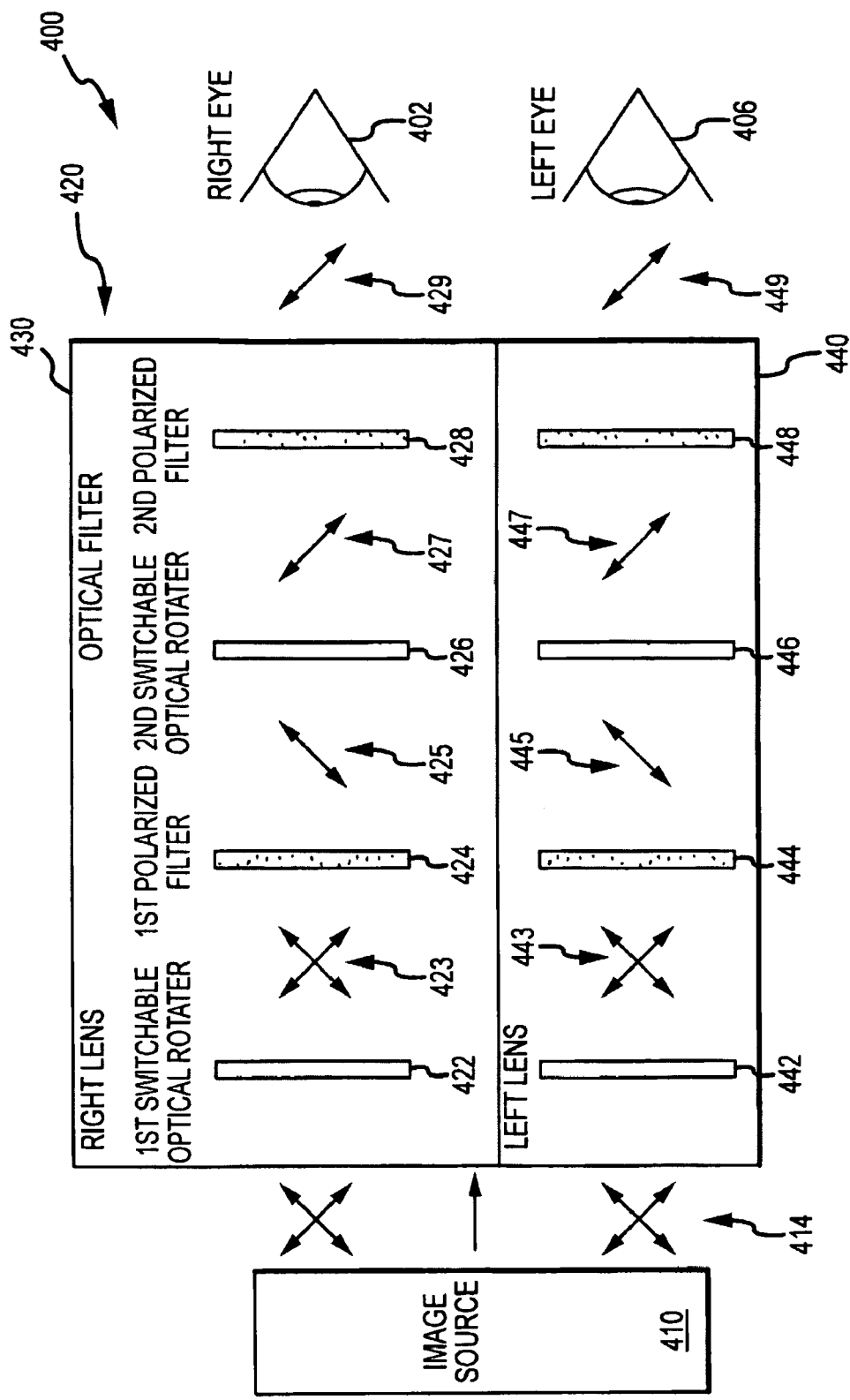
FIG. 4 illustrates a functional block drawing of a multiple image display or viewing system in which a viewer uses a composite image stream and optical filter in accordance with the invention to select images associated with a particular time slot and between one of two images in the composite stream.

FIG. 4 illustrates a system 400 for presenting multiple separable images to one or more viewers that use an optical filter configured in accordance with the invention. As shown, the system 400 includes an image source 410 that provides a multiple image stream 414 (e.g., a composite stream like stream 350 of FIG. 3 or one with up to 12 or more separable image streams in 6 or more image pairs in time slots of a frame). The stream 414 includes a first set of images polarized at a first orientation and a second set of images polarized at a second orientation orthogonal to the first orientation, typically with an image of each stream (an image pair) presented in each time slot.

Figure 1:
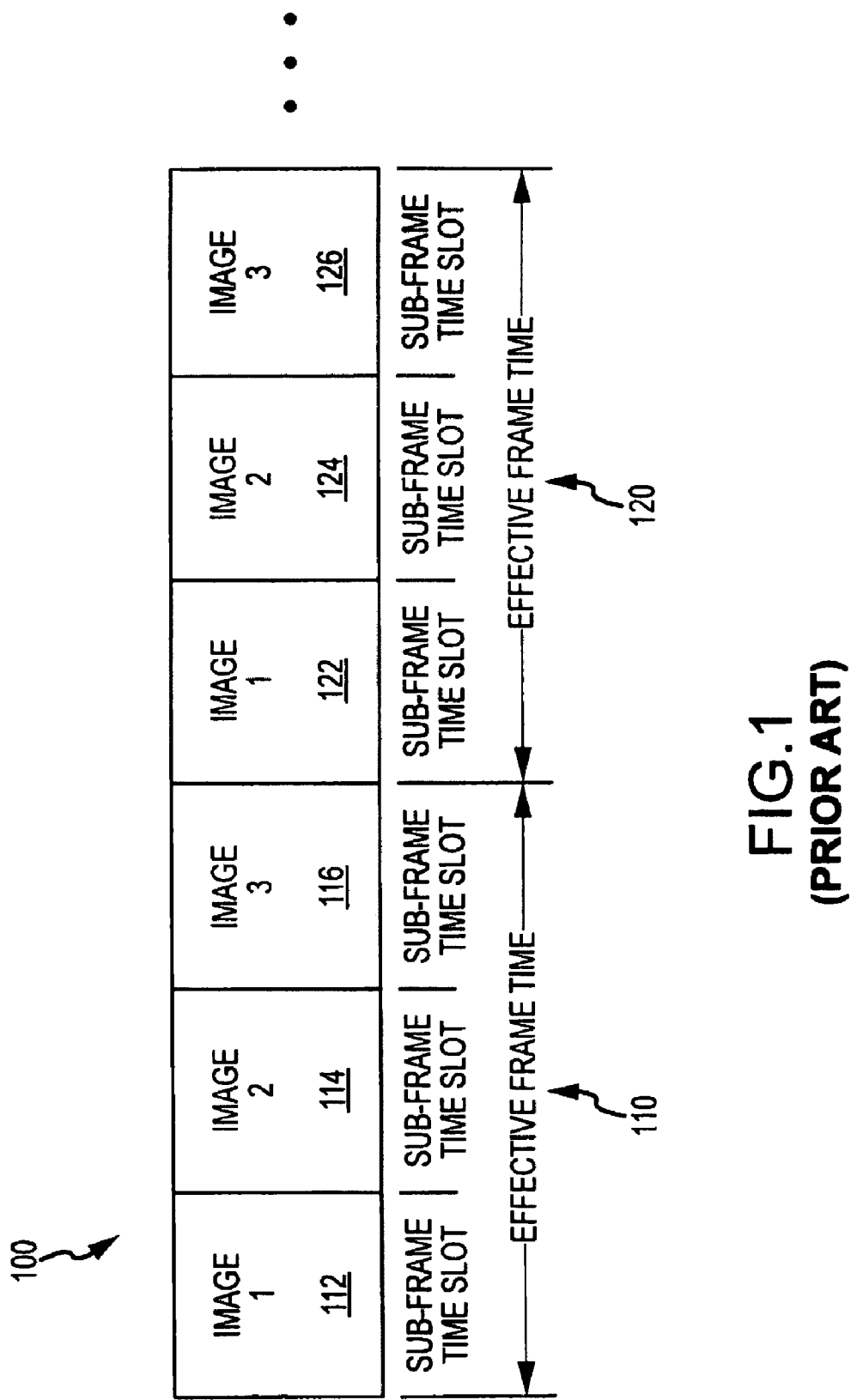
FIG. 1 illustrates an image or video stream with multiple, separable images provided per frame, with each image being presented in a particular sub-frame time slot to support viewing with shuttered glasses or similar viewing devices.
Figure 2:
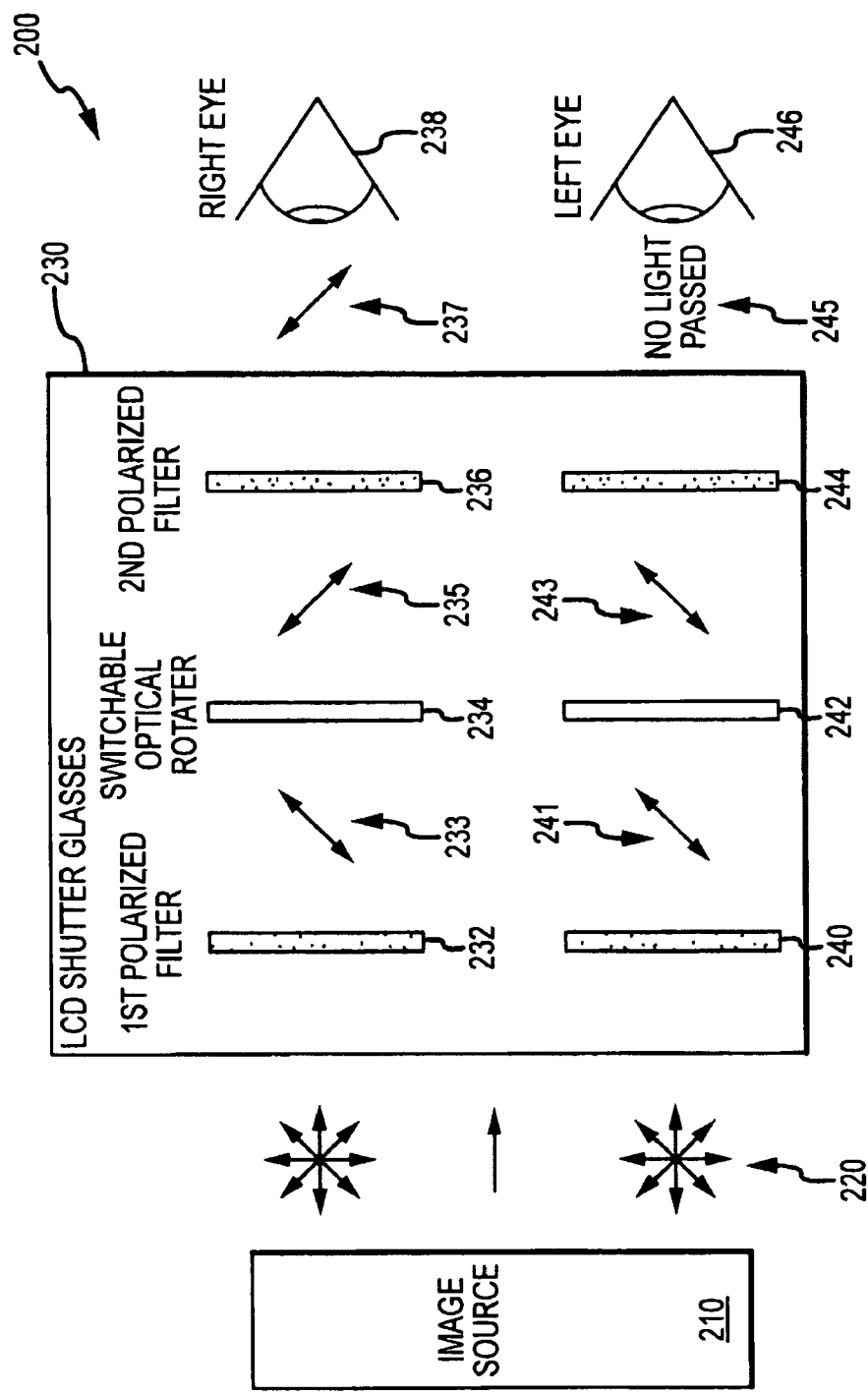
FIG. 2 illustrates a functional block drawing of a multiple image display system in which a viewer uses LCD shutter glasses to view separable images in a multiple image stream from an image source.

The system 400 includes an optical filter or viewing mechanism 420 that may be implemented using LCD shutter glass technologies or other components useful for providing the functionality described herein. A right lens (or right portion of an optical screen, glass, mask, filter, or the like) 430 and a left lens 440 are provided to pass or block portions of the stream 414 to the right eye 402 and left eye 406, respectively, of a viewer (not shown). Similar filters 430 may be provided to each viewer in the system 400. As shown, the right and left lens 430, 440 include a set of components that are operated to choose time slots or a separable image within a stream for viewing (e.g., channels), and these components include a first polarization filter 424, 444, a second switchable optical filter 426, 446, and a second polarization filter 428, 448. With reference to FIG. 2, these components are provided in conventional LCD shutter glasses, and their operation in the filter 420 is similar to that described for operation of the glasses 230 to block or filter all but one of the time slots for viewing. This may be achieved by use of a controller that selectively energizes and de-energizes the optical rotator 426, 446 to set the operating state of the filter 420, and operation of the controller is synchronized with operation of the image source 410 to provide shuttering that passes images of only one time slot to the viewer's eyes 402, 406.

Significantly, the optical filter 420 further includes components that allow it to choose between two image streams that have been combined with orthogonal polarization orientations. As shown, the right and left lens 430, 440 are each modified, as compared with convention shutter glasses, to include a first switchable optical rotator 422, 442 upstream of the first polarization filter 424, 444. The first optical rotator 422, 442 may be controlled by a controller such as by being energized or de-energized to rotate the polarization of the incoming or received image stream 414. Such rotation acts to select which of the two streams of separable images in the composite stream 414 is viewable by the viewer (e.g., either the images in stream 310 or in stream 330 of composite stream 350 in FIG. 3).

In operation of the system 400, the number of different images that can be presented to a viewer is doubled when compared with conventional shutter glasses viewing a standard image stream by adding the additional switchable optical rotator 422, 442 in each lens 430, 440 of optical filter 420. The optical rotator 422, 442 may be similarly configured as the rotator 426, 446, such as using the same material (e.g., twisted nematic LCD or the like) as the optical rotator. 234, 242 of FIG. 2 of conventional shutter glasses. The additional optical rotator 422, 442 allows either of the polarized images to be aligned with the first polarization filter 424, 444 of either eye and, therefore, can be used to "select" the image passed to each individual eye 402, 406 by the rotation of the passed light 423, 443 that is passed to filter 424, 444 (the rotators 422, 442 are not energized in FIG. 4 and act to rotate the image streams in composite stream 414 by 90 degrees). The polarization filters 424, 426, 444, 446 for each eye 402, 406 can either be aligned so that the first polarization filter 424, 444 for each eye 402, 406 is at the same orientation (as shown in FIG. 4) or with the orientation for one eye rotated by 90 degrees from the other eye.

As described above, light 423, 443 incident upon the first polarization filter 424, 444 is passed as shown at 425, 445 only if it is aligned with the polarization axis of the first polarization filter 424, 444. Light polarized orthogonal to the polarization axis of the first polarization filter 424, 444 is blocked, with FIG. 4 showing one of the two streams from the composite stream 414 being passed to the second switchable optical rotator 426, 446 in each lens 430, 440. When the first switchable optical rotator 422, 442 is energized, light 423, 443 passes through without modification so that light for one of the orthogonally polarized images is aligned with the polarization axis of the first polarization filter 424, 444 and passes (as shown at 425, 445) through the filter 424, 444. The light for the other image is orthogonal to the polarization axis of the first polarization filter 424, 444 and is blocked by the filter 424, 444 with passed images/image stream 424, 445 shown as only including one of the polarized image streams from the composite image stream 414. When the first switchable optical rotator 422, 442 is not energized (as shown), light 423, 443 passing through the rotator 422, 442 is rotated by 90 degrees. The result of this optical rotation (or lack thereof) is that the light for the image that was passed shown at 423, 443 can be orientated to cause the first polarization filter 424, 444 to select one of the two separable image sets or image streams, with the selected image stream shown at 425, 445 after passing through the filter 424, 444.

Selection between 2D images in this passed stream 425, 445 is typically accomplished by synchronizing the second switchable optical rotator 426, 446 such that the left and right eye shutters of the lenses 430, 440 are synchronized with the same time slot and also synchronizing the first switchable optical rotator 422, 442 in the lenses 430, 440 such that the same polarized image stream 425, 445 is passed to each eye 402, 406. Selection between 3D images, in contrast, is typically accomplished by synchronizing the second switchable optical rotator 426, 446 such that the left and right eye shutters of lenses 430, 440 are synchronized with the same time slot and synchronizing the first switchable optical rotator 422, 442 such that one of the polarized images 425 is passed to the right eye 402 while the other one of the polarized images 445 is passed to the left eye 406 (e.g., first and second orthogonally polarized image streams of the composite stream 414 are passed to differing eyes). Basically, the time synchronization of the first and second switchable optical rotators 426, 446 is used to select a time slot in each frame for viewing. Whether or not the first switchable optical rotator 422, 442 is energized determines which of the two polarized images in the time slot are passed to the viewer in system 400.

With the system 400, the number of different images that can be represented depends on the number of time slots available with only 0.5 time slots being needed for each 2D image and only 1 time slot being needed for each 3D image (as compared with 1 time slot for a 2D image and 2 time slots for a 3D image with prior techniques). For example, if a video stream provides 6 time slots per frame, the system 400 may be used to represent up to twelve 2D images (i.e., 6 time slots divided by 0.5 time slots per 2D image) or up to six 3D images (i.e., 6 time slots divided by 1 time slot per 3D image).

A simple case exists in which a single time slot is used to project a pair of polarized images. In this case, only the first switchable optical rotator 422, 442 and the first polarization filter 424, 444 are needed to allow a viewer to switch between the two images, and no synchronization is needed in this case (but, of course, views are limited to the selection between two 2D images).

Figure 5:
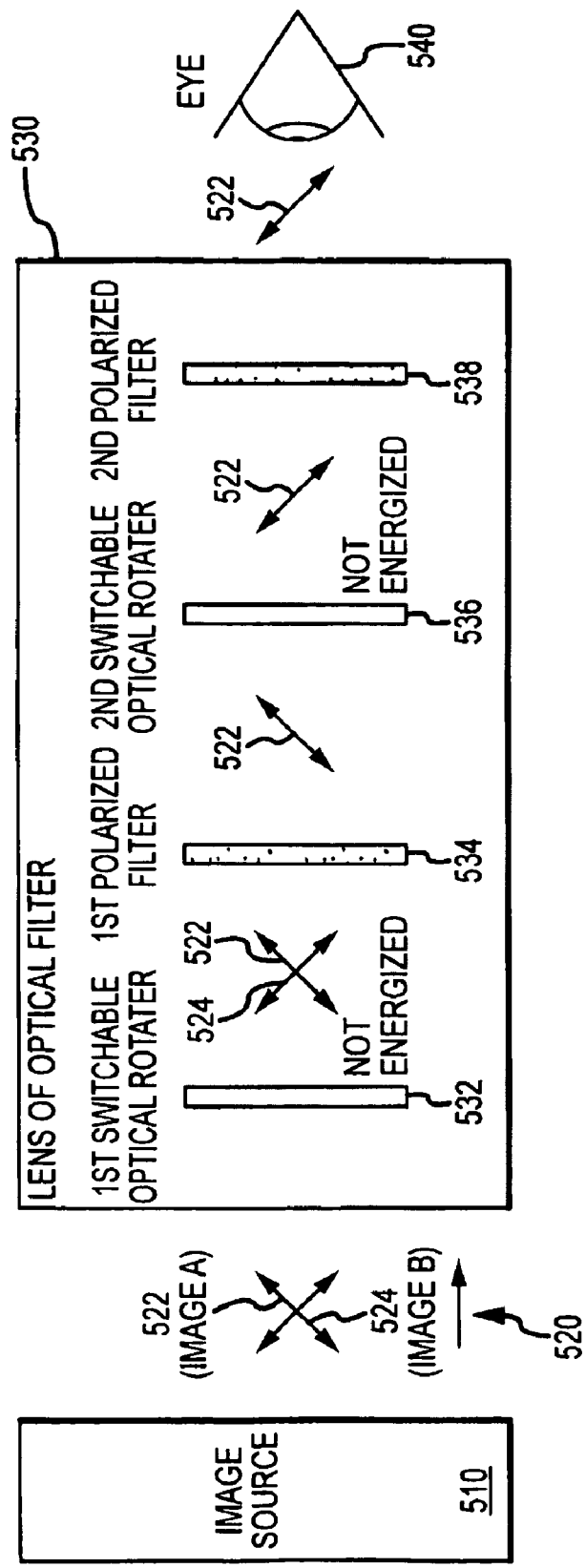
FIGS. 5-8 illustrate functional block drawings of a single lens (or left/right eye portion) of an optical filter or viewing mechanism showing four operating states used to select one of two polarized images and to selectively pass images (e.g., to support selection of a time slot within a stream)

The following discussion provides an example implementation of one lens of an optical filter to show its four operating states of the rotating polarized shutters. The response for an individual time slot is described in the examples, and, in this implementation as shown in FIG. 5, a pair of orthogonally polarized images (i.e., Images A and B) 522, 524 are projected/displayed in a composite image 520 from image source 510 during each time slot (or image 520 may be considered a stream of separable images). Image A (element 522) refers to polarized light for a first image (or image A) and is represented with a bold line. Image B (element 524) refers to polarized light for a second image (or image B) in a time slot and is represented with a narrower line in the figures. The lens or filter shutter assembly 530 (such as used in an optical filter of the invention such as LCD shutter glasses or the like) includes first and second switchable optical filters 532, 536 alternated with first and second polarization filters 534, 538, with the rotators 532, 536 being selectively energized by a controller/power source (not shown in FIGS. 5-8).

With regard to the projected/displayed image, in this example of FIGS. 5-8, the polarization axis of the first polarization filter 534 is aligned with the second image 524 (Image B) while the polarization axis of the second polarization filter 538 is aligned with the first image 522 (Image A). The polarization axis of the first polarization filter 534 is rotated by 90 degrees relative to the polarization axis of the second polarization filter 538. The switchable optical rotators 532, 536 pass light unchanged when they are energized and rotate the light by 90 degrees when not energized (but, of course, the rotators may be adapted to operate in an opposite manner to provide selective rotation of polarized light/images).

FIG. 5 illustrates a first operating state of the optical filter lens or shutter assembly 530. As shown, neither of the rotators 532, 536 is energized. As a result, incoming images 522, 524 of composite image 520 are rotated 90 degrees by the first optical rotator 532 such that the first image 522 (Image A) is aligned with the first polarization filter 534. When the rotated images 522, 524 strike the first polarized filter 534, the first image 522 (Image A) is passed through the filter 522 while the second image 524 (Image B) is blocked. The first image 522 (Image A) is then rotated 90 degrees by the second optical rotator 536, which is not energized, such that the image 522 (Image A) is aligned with the second polarization filter 538. The second polarization filter 538 passes the aligned image 522, whereby Image A is "shown" to the viewer's eye 540. Again, in practice, the first rotator 532 acts to select which of (or whether) the two images 522, 524 are shown while the two polarization filters 534, 538 and second rotator 536 act to choose which time slot in a stream of such paired images 522, 524 is chosen for viewing.

Figure 6:
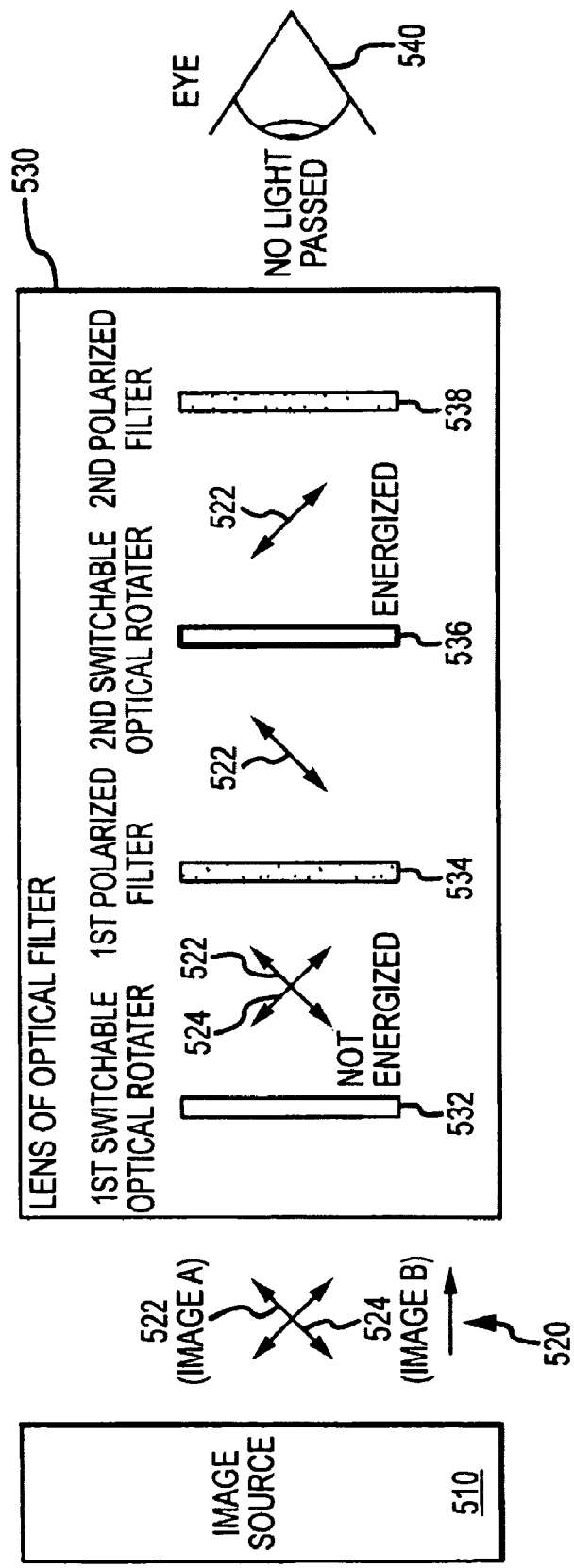

FIG. 6 illustrates a second state of operation for the lens assembly 530 in which the first switchable optical rotator 532 is not energized but the second switchable optical rotator 536 is energized. In this operating state, incoming images 522, 524 of composite image 520 are rotated by the first optical rotator 532 such that the first image 522 (Image A) is aligned with the first polarization filter 534. Hence, the first image 522 (Image A) is passed by the first polarization filter 534 while the second image 524 (Image B) is blocked. The image 522 (Image A) is then passed unchanged by the second switchable optical rotator 536, which is energized, such that the image 522 is orthogonal to the second polarization filter 538. The image 522 (Image A) is thus blocked by the filter 538, and no light from image source 510 being passed to the eye 540 (or no images are shown in this operating state).

Figure 7:
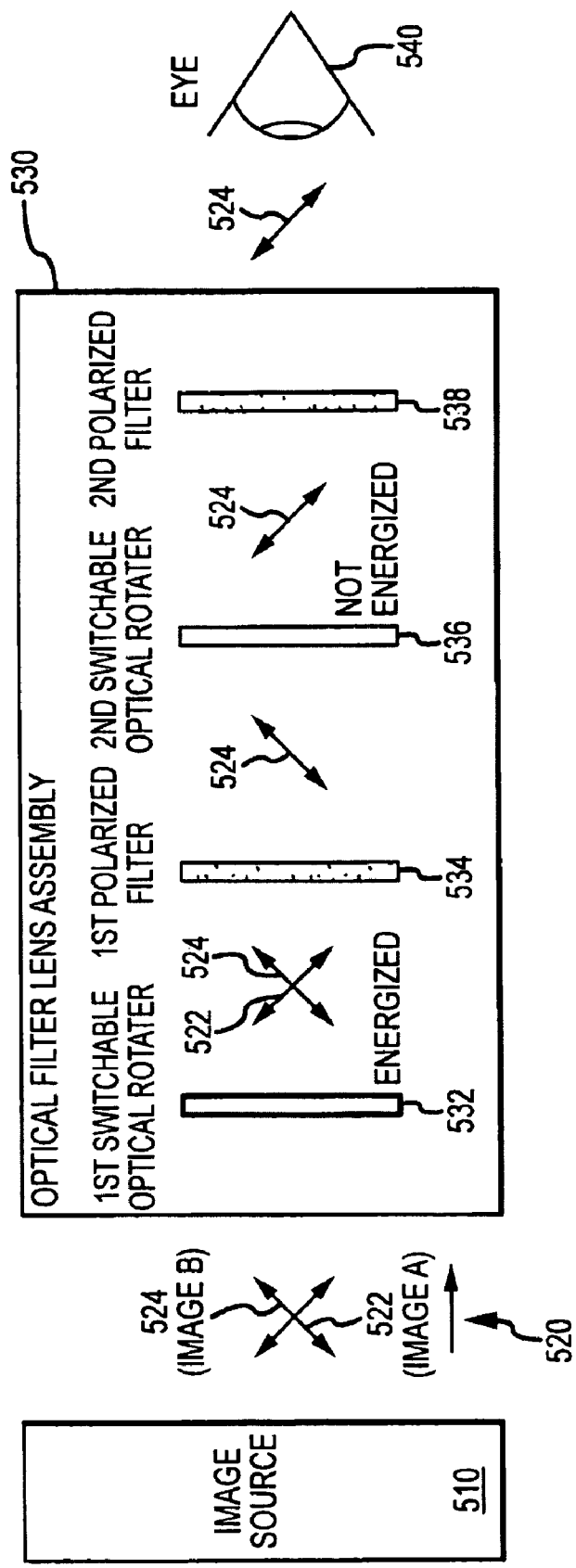

FIG. 7 illustrates a third operating state for the lens assembly 530 in which the first switchable optical rotator 532 is energized and the second switchable optical rotator 536 is not energized. In this operating state, incoming images 522, 524 from image source 510 are passed unchanged by the first optical rotator 532 such that the second image 524 (Image B) is aligned with the first polarization filter 534 (i.e., the rotator 532 is operated to select Image B in this state). The second image 524 (Image B) is then passed by the first polarization filter 534 while the first image 522 (Image A) is blocked. The second image 524 (Image B) is then rotated by 90 degrees by the second switchable optical rotator 536, which is not energized, such that the image 524 is aligned with the second polarization filter 538. As a result, the second image 524 (Image B) is passed by the second polarization filter 538 to be shown to the viewer's eye 540.

Figure 8:
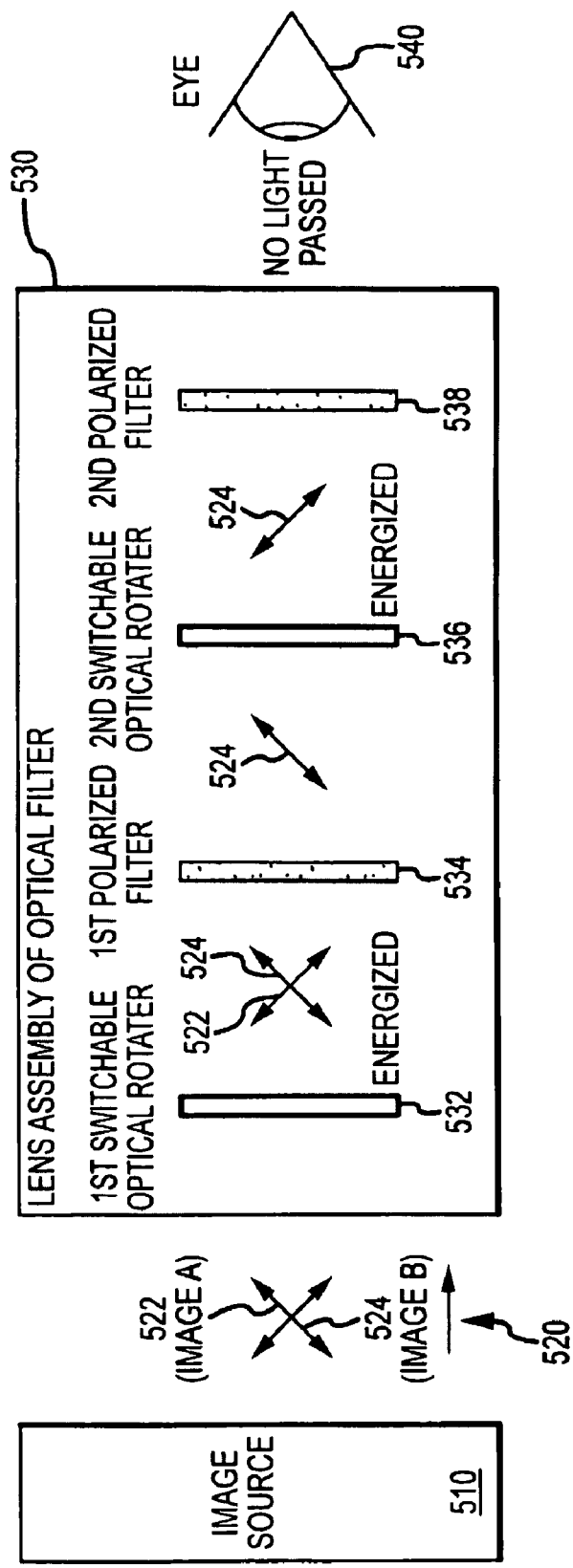

FIG. 8 illustrates a fourth operating state of the lens assembly 530 of an optical filter in accordance with an embodiment of the invention. In this operating state, the first and second switchable optical rotators 532, 536 are both energized. Incoming images 522, 524 are passed unchanged by the first optical rotator 532 such that the second image 524 (Image B) has its polarization orientation aligned with the first polarization filter. Hence, the second image 524 (Image B) is passed by the first polarization filter 534 while the first image 522 (Image A) is blocked. The image 524 is then passed unchanged by the second optical rotator 536 such that the second image 524 (Image B) is orthogonal to the second polarization filter 538. As a result, the image 524 (Image B) is blocked by the second polarization filter 538 and no light is passed by the lens assembly 530 to the eye 540 (i.e., no images from composite image 520 are shown to the viewer) in this operating state of assembly 530.

Figure 9:
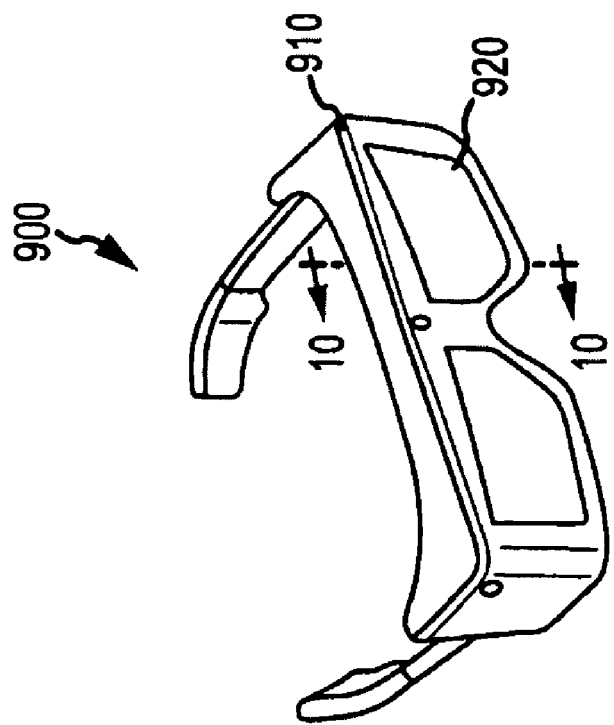
FIG. 9 is a perspective view of an embodiment of an optical filter provided in the form of LCD shutter glasses.

The optical filter or viewing mechanisms described herein may be implemented in some cases in the form of shutter glasses, goggles, visors, or the like worn by a viewer, an audience member, or other user of the technology. FIG. 9 illustrates one embodiment of an optical filter assembly 900 that takes the form of a pair of LCD shutter glasses. The LCD shutter glasses 900 are adapted with a pair of switchable optical rotators in contrast to conventional shutter glasses to allow concurrently displayed image streams or separable images to be chosen in addition to selection of time slots within such streams/images. The LCD shutter glasses 900 may be particularly well suited for use in doubling the number of 2D images that may be shown to a viewer wearing the glasses 900 but may also be used to increase the number of separable 3D images in a multi-viewer application.

As shown in FIG. 9, the LCD shutter glasses 900 include a frame 910 with bows to support the glasses 900 on a viewer's ears as well as a frame for resting on the viewer's nose. The frame 910 also includes a housing for supporting right and left lenses 920, which are adapted to provide the functionality to select between two orthogonally polarized images or image streams. The glasses 900 may also include a controller and power source (such as a battery) for controlling operation of the lenses 920 as discussed herein to select an image stream and a time slot within such a selected stream to present an image to a person wearing the glasses 900. In some cases, the housing 910 may also include switches to allow a user to manually or otherwise choose which image stream and/or time slot they are able to view (e.g., select a "channel" associated with one of the separable images presented to the glasses 900) or such image selection may be controlled remotely from the glasses 900. During use, a user wears the glasses 900 and views images/streams (such as stream 520 shown in FIGS. 5-8) from an image source and the lens 920 are operated (selectively energized rotators) to block all but one image in a set of separable images or in a stream from passing to the user's eyes.

Figure 10:
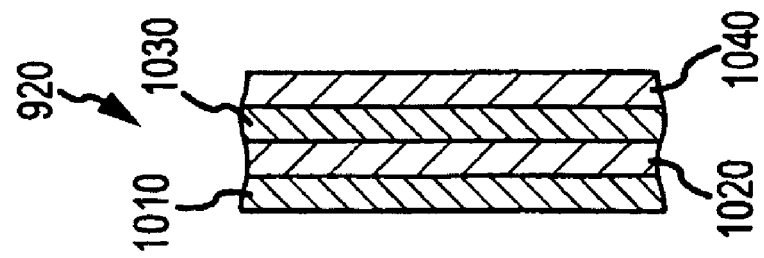
FIG. 10 is a partial cross section taken at 10-10 from the optical filter of FIG. 9 showing four layers/components of a lens of the LCD shutter glasses.

To this end, FIG. 10 shows a partial cross section of the glasses 900 showing a sectional view of one of the lenses (i.e., the left lens 920 in this case). The lens 920 includes a first switchable optical rotator 1010 that would face outward of the frame 910 and receive a pair of orthogonally polarized images from an image source. The next layer of the lens 920 is a first polarized filter 1020, and the filter 1020 is sandwiched between the first switchable optical rotator 1010 and a second switchable optical rotator 1030. The rotators 1010, 1030 are selectively energized to provide the selection of one of the two orthogonally polarized images/image streams (i.e., through selective energizing of the first optical rotator 1010) and to select a time slot or image within a stream of such images (i.e., through selective energizing of the second optical rotator 1030), as discussed with reference to FIG. 5-8. The lens 920 further includes a second polarized filter 1040, and the filters 1020, 1040 sandwich the second optical rotator 1030 and act in conjunction with the rotator 1030 to select a time slot (or image within a stream or frame of a stream) for viewing as discussed with reference to FIGS. 5-8. The lens 920 may be manufactured using materials and techniques known or developed for producing LCD or other shutter glasses 900, and the layers 1010-1040 may be in contact with each other as shown or gaps and/or additional layers of materials may be provided in the lens 920.

In some embodiments, the optical filter and orthogonally polarized image stream concepts are used in a multi-viewer setting that allows the audience member to interact and/or choose which image of a set of separable images to view with their optical filters (e.g., LCD shutter glasses and the like). For example, the inventive concepts may be used in an interactive theater system to provide "on demand" experiences where audience members can switch between viewing channels or filter operating states at any time during display of a set of video streams on a display surface. In other cases, the system controller or other devices may operate to only allow switching at particular points in time, and the switching may be manual by the operator or automatically based on user input/actions (e.g., determining when an audience member takes an action such as leaning to the left or right in their chair). In the following description, "user input" is considered to cover nearly any action that can be processed or used to choose between various image streams (e.g., a physical action or speech and so on) such as between one of two or more 2D and/or 3D images that are presented on a display surface in a composite image made up of two orthogonally polarized images (or image streams having first and second polarization orientations that are offset or rotated by 90 degrees).

Figure 11:
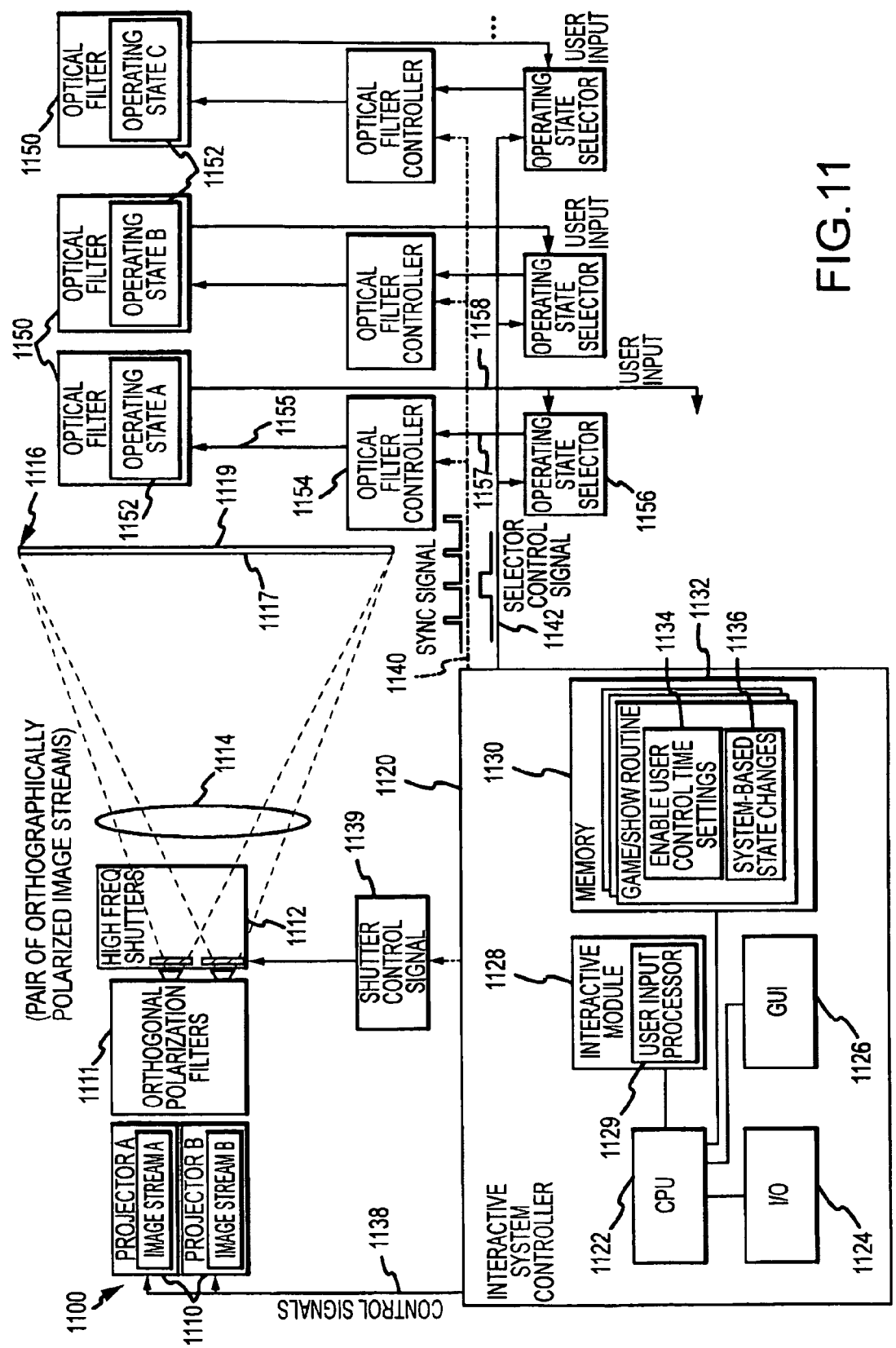
FIG. 11 illustrates a functional block diagram illustrating use of the optical filter design of the invention in combination with orthogonally polarized image streams in an interactive theater application to increase a number of viewable images.

FIG. 11 illustrates a multi-viewer/multi-image system 1100 (e.g., an interactive theater system) in accordance with an embodiment of the invention. The system 1100 includes a projection assembly with two projectors 1110 adapted to display images/image streams (such as image stream 310 (Image A) and image stream 330 (Image B) shown in FIG. 3 or the like). Associated with the projectors is a pair of orthogonal polarization filters 1111 and a set of high frequency shutters 1112 that operate to generate/display/project composite image stream 1114 (e.g., frames of animated works, a film(s), a video game, or the like that include images in time slots within each frame with a first polarization orientation and images with a second polarization orientation that is rotated 90 degrees relative to the first polarization orientation as shown for stream 350 of FIG. 3). The composite image stream (or sets of pairs of orthogonally polarized images) is displayed on device surface 1116, which may be a rear projection device screen such that the images 1114 are projected onto rear surface 1117 but displayed on front or viewing surface 1117 to audience members or viewers. In other cases, nearly any surface or object may be used as the display device 1116 as the invention is not limited to a particular display surface or technique.

The system 1100 is shown to include a plurality of optical filters 1150 that are each used to filter all but one stream (or separable image) from image streams (or composite image) 1114 on display 1116 such that viewers or audience members on an opposite side of the filters 1150 are able to selectively view an image stream in a selective manner. For example, the optical filters 1150 may be glasses/goggles or a helmet shield worn by the audience members or may be provided in other forms such as windows that are shared among two to four or more audience members for viewing an image on a display (e.g., a windshield of a vehicle in a theme ride). An important factor being that each filter 1150 is adapted for having two or more operating states 1152 to affect filtering of all but one image stream from image streams 1114 (e.g., operating states explained with reference to FIGS. 5-8) and not necessarily how this filtering is achieved. As noted above, the optical filters 1150 may be LCD or other shutter glasses. In other cases, color filter glasses are used for the filters 1150 while polarizing glasses of various configurations may be used for the filters 1150. The selection of the optical filters 1150 may alter the selection of the projectors 1110 and/or media/streams 1114 to support the proper operation, filtering, and then viewing of the images 1114.

The optical filters 1150 have their operating states 1152 set by control signals or operation of optical filter controllers 1154, and the operating states 1152 may be the same such that the filters 1150 operate to pass the same image stream to all audience members. In other cases, as shown, the operating states 1152 may differ such that audience members or viewers receive or are shown differing image streams (e.g., as shown, the audience members would be shown 3 or more differing image streams). The optical filter controller 1154 may receive a time synchronization signal 1140 from interactive system controller 1120 and operates to set the channel or operating state 1152 based on an operating state selection signal 1157 received or chosen by the system controller 1120 or an operating state selector 1156 based upon user input 1158.

The interactive system controller 1120 may be embodied in a number of computers or electronic devices such as a computer device/server with a CPU 1122. The CPU 1122 controls user input/output devices 1124 and optionally providing a graphical user interface (GUI) 1126 on a monitor or the like that allow an operator to manually issue selector control signals 1142 to change the operating state 1152 of one or more of the optical filters 1150. More typically, though, the controller 1120 acts to transmit a shutter control signal 1139 and a synchronization signal 1140 to the filter controllers 1154 to allow these devices to work in unison to allow the filters to properly allow one image stream to pass to a viewer at a time (e.g., left and right frames and so on). An interactive module 1128 (e.g., a software program or application) may be provided to facilitate audience interaction and, in response, to transmit the selector control signals 1142. For example, the module 1128 may include user input processor 1129 to process user input 1158 to determine which operating state 1152 to place the filters 1150. In one exemplary embodiment, the user input 1158 involves the audience members leaning in their chair to the left or right and the input processor 1129 determines the lean direction and responsively selects an operating state 1152 to choose a corresponding one of the image streams 1114.

The controller 1120 may also include memory 1130 storing a game/show routine 1132 that include time settings for transmitting selector control signals 1142 to the operating state selectors 1156. In one case, when these signals 1142 are sent to a set of selectors 1156, the associated audience members may provide user input 1158 to choose the operating states 1152 (e.g., to change the channel to view a differing image stream among concurrently displayed streams 1114). In other cases, the game/show routine 1132 may be configured to process user input 1158 at particular times during transmittal of streams (when control signals 1138 are being sent by controllers 1120) and then transmit selector control signals 1142. For example, audience interaction may be requested by the content of streams 1114 such as lean to the left if you want a particular outcome or yell loudly to cause another effect and so on. The user input processor 1129 may process this input and, in response or based on such processing, choose a particular image stream and send a corresponding selector control signal 1142. In some cases, the game/show routine includes a set of system-based state changes 1136 that cause particular selector control signals 1142 to be transmitted during operation of the projectors 1110 (e.g., during a particular display activity or event such as an interactive game) so as to choose a particular image stream for the audience members (the same or differing image streams for audience members). In this later operating mode, the changes in operating state are not performed in response to user inputs but are performed during the display of a particular set of image streams to cause a change by altering operation of the local optical filters 1150 and, typically, to cause the viewing experience to differ for at least some of the audience members.

As discussed above, a problem addressed by embodiments of the present invention is how to better provide group interactive experiences and gaming for large numbers of people. In the past, it has proven especially difficult to provide interactive experiences to groups in a way that felt personal and satisfies each audience member's desire to be heard or treated as if their input were significant. Most prior attempts relied upon some sort of democratic vote/action, which left a large number of the audience disappointed when they were in the minority and their selection was not used/chosen. There also often was a delay, as the action chosen by the majority was not taken immediately.

Figure 12:
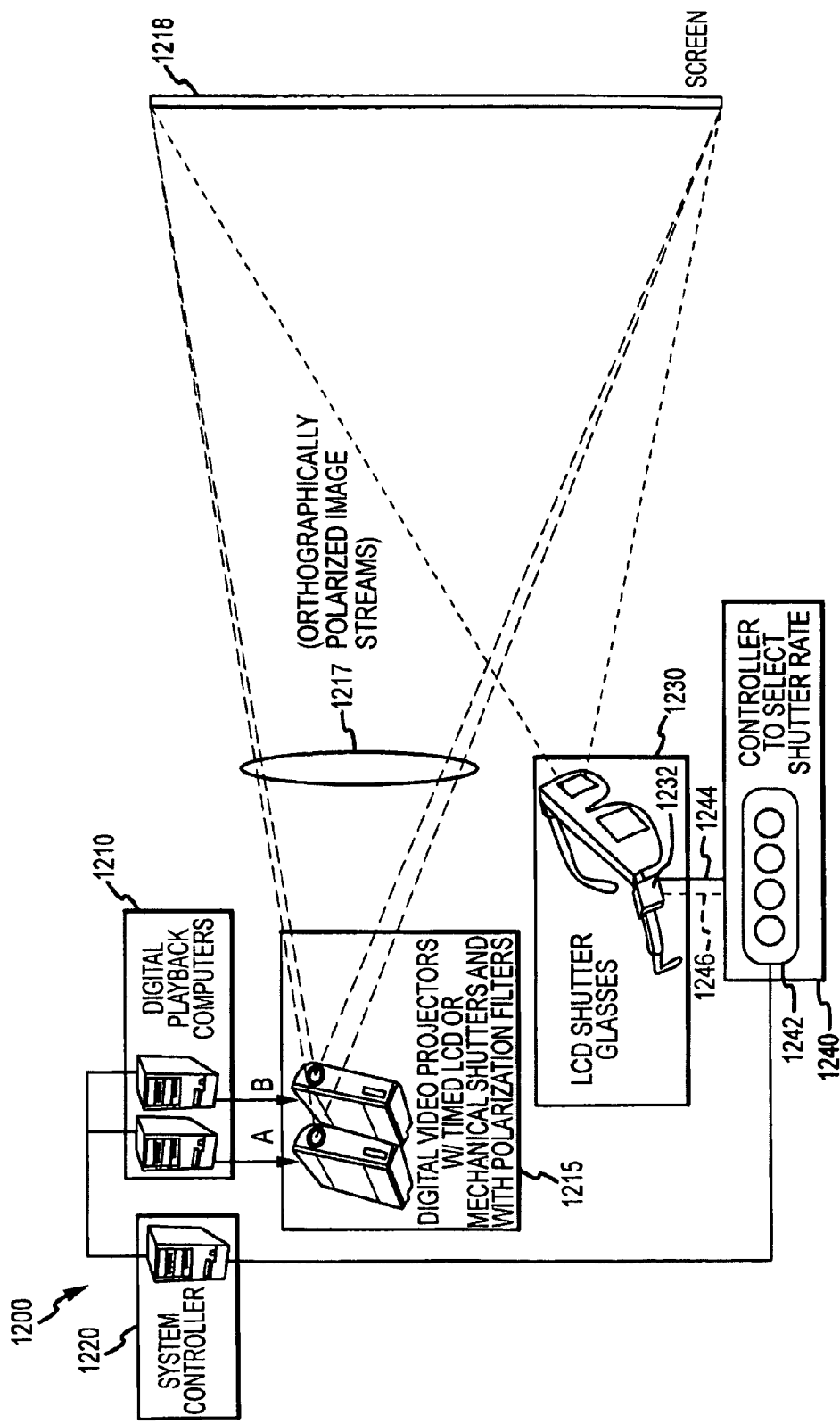
FIG. 12 illustrates another interactive theater system in accordance with an embodiment of the invention that utilizes LCD shutter glasses with a user input device with buttons/switches for selecting the shutter rate, and therefore, a particular displayed video stream (e.g., user-selection of a particular one of a set of separable images for viewing).

FIG. 12 illustrates one embodiment of a multi-viewer/multi-image system 1200 adapted to provide audience members with a more immediate gratification/satisfaction. As shown, the system 1200 includes digital playback computers 1210 that are used to provide a like number of image streams (e.g., streams A and B which may be frames associated with a left or right eye view as discussed above) to a set of digital video projectors with timed LCD or mechanical shutters 1215. These projectors 1215 provide time-multiplexed projection of image streams 1217 that is capable of multiple views (e.g., two or more image streams that may be made up of paired left and right images or image frames). The images 1217 include a number of playback streams that is generally limited in magnitude by shutter rate technology, but, this number or limitation is doubled (or the display capacity of separable images is increased by 100 percent) according to the invention by including a pair of polarization filters such that the image stream 1217 is a composite stream or image made up of two streams/images that are polarized with orthogonal orientations. The composite image stream 1217 (or set of separable images) is displayed via the display screen 1218 (front projection screen, rear projection screen, or other display surface/device).

Each audience member in the system 1200 is provided a pair of LCD shutter glasses 1230, with the number of glasses 1230 being unlimited to implement system 1200. The LCD shuttered glasses 1230 may be configured as shown in FIGS. 9 and 10 (or to implement the functionality described with reference to FIGS. 5-8), and they may include a shutter controller 1232 on the glass frame that is operable to shutter the glasses 1230 at a frequency synchronized with one image stream (or with an image viewing channel associated with one of the two polarized images and a time slot for the frames within that selected image/images stream). A controller 1240 may be handheld or mounted upon the audience member's chair with buttons/switches/knobs 1242 that allow a user to select the shutter rate or choose a viewing channel. In other cases, the channel selector/controller 1240 is provided on the glasses frame such as by being mounted as part of shutter controller 1232. The controller 1240 may be hardwired to provide a communication and power supply link to the shutter controller 1232 as shown with line(s) 1244 or may optionally be wireless linked as shown at 1246 with a battery or other power supply provided in or near the glasses frame. A system controller 1220 (e.g., another computer device as shown in FIG. 11 or the like) is linked to the playback computers 1210 and the shutter rate controller 1240 to provide time code and/or frame synchronization pulses to allow synchronized operation of the projectors 1215 and LCD shutter glasses 1230.

As discussed, the particular techniques/mechanisms for presenting or providing multiple image streams upon a display surface or screen and for allowing differing audience members to view these images may vary widely to practice the invention. A more important aspect is that the number of images that is presented may be doubled by implementing the optical filters of the invention and displaying two streams/image sets that are orthogonally polarized concurrently in a composite image/image stream. However, in some cases, the device (or projector assembly) for displaying multiple separable images that are interleaved or time multiplexed in an image stream or set of separable images on a display surface or screen may be configured as taught in U.S. Pat. Appl. Publ. No. 2007/0266412 to Trowbridge et al., which is incorporated herein in its entirety by reference. Similarly, the method and/or mechanisms for allowing viewers to see one of the displayed multiple streams at a time may be as taught in this reference, but with the addition of mechanisms or modifications to select between one of two polarized images/image streams and, in some implementations, to allow the operating state (or shuttering frequency) to be switched during the display period (e.g., switching devices operable based on system control signals and/or user input).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. For example, this description has described implementations in which the technology is configured in a manner suitable for stereo vision, but the techniques described may also be applied in some cases to other configurations including a window or view port rather than LCD shutter glasses or other optical filters worn by a viewer. It should be understood that the orientation of the first and second polarization filters is arbitrary and may be varied to practice the invention and obtain the described selective viewing of particular images in certain time slots in one of two image streams (or to choose between two polarized images). Operation of the switchable optical rotator above (e.g., with reference to FIGS. 5-8) describes a common implementation using a twisted nematic liquid crystal. Particularly, when the crystal is not energized light passing through the rotator is rotated by 90 degrees and when the crystal is energized light passing through the rotator is passed through unchanged/unrotated. However, the concepts described herein work just as well if the behavior of the optical rotator is reversed, i.e., the rotation occurs when the liquid crystal or other material is energized rather than when not energized.

I claim:

1. A method for providing differing image streams on a display surface for viewing by members of an audience, comprising:
    positioning a plurality of optical filters between the display surface and the members of the audience;
    providing a composite image stream on the display surface, wherein the composite image stream comprises a first image stream having a first polarization orientation and a second image stream having a second polarization orientation and wherein the first image stream is independent of the second image stream; and
    operating a set of the optical filters in an operating state to block one of the first and second image streams based on polarization orientation from being viewed by at least a portion of the members of the audience.

2. The method of claim 1, wherein the first polarization orientation is orthogonal to the second polarization orientation.

3. The method of claim 1, wherein the first and second image streams each comprises a plurality of images presented in sequential time slots in frames and wherein the operating of the set of the optical filters in the operating state further includes selectively passing the images associated with a particular one of the time slots.

4. The method of claim 3, further comprising separately operating the set of optical filters in a different operating state to selectively pass the previously-blocked one of the first and second image streams and to selectively pass the images associated with a different one of the time slots.

5. The method of claim 3, wherein the optical filters comprise a pair of switchable optical rotators selectively operable to rotate the composite image stream to rotate the first and second polarization orientations by 90 degrees, whereby one of the first and second image streams is passed through a first polarization filter and wherein the images associated with the particular time slot are passed to the audience members by selectively energizing of one of the optical rotators to align the images with a second polarization filter.

6. The method of claim 5, wherein the operating state corresponds to shuttering frequencies for selectively energizing the switchable optical rotators in a time-based manner that is synchronized with the providing of the image streams.

7. The method of claim 1, wherein the first and second image streams are displayed concurrently, the first and second image streams each comprises separable images presented in time slots of sequential frames, and the optical filters comprise LCD shutter glasses comprising a pair of polarized filters with orthogonal alignments and a pair of switchable optical rotators sandwiching one of the polarized filters and selectively energized to rotate the composite image to selectively pass one of the first and second image streams and the separable images of one of the time slots.

8. The method of claim 1, wherein the first image stream and second image streams comprise, respectively, alternating right and left eye views of a first image and a second image differing from the first image.

9. A multi-image display system, comprising:
    an image source concurrently displaying a first image stream of separable images during a set of time slots and a second image stream of separable images during the time slots, wherein the first image stream is polarized at a first orientation and the second image stream is polarized at a second orientation; and an optical filter operable to first filter the concurrently displayed first and second image streams to pass one of the first and second image streams and to second filter the passed one of the first and second image streams to pass the separable images associated with one of the time slots, wherein the first orientation is orthogonal to the second orientation and wherein the optical filter comprises a first switchable optical rotator and a first polarization filter, the first switchable optical rotator rotating the concurrently displayed first and second image streams to align the passed one of the first and second image streams with the first polarization filter, wherein the optical filter further comprises a second switchable optical rotator and second polarization filter downstream from the first polarization filter, and wherein the second switchable optical rotator rotates the passed one of the first and second streams to perform the second filtering including selecting the one of the time slots.

10. The system of claim 9, wherein the first and second switchable optical rotators each comprises a twisted nematic LCD element.

11. The system of claim 9, wherein the optical filter comprises a pair of LCD glasses including in each lens a switchable optical rotator upstream of the shuttering mechanism for performing the first filtering, with the shuttering mechanism performing the second filtering.

12. The system of claim 11, wherein the switchable optical rotator comprises an LCD element selectively aligning one of the first and second image streams with a first polarized filter of the shuttering mechanism to cause the passed one of the first and second image streams to pass through the first polarized filter.

13. The system of claim 9, the time slots comprises at least four time slots for presenting at least eight of the separable images in the first and second image streams.

14. An apparatus for selectively passing a set of images presented in a time slot of a time-multiplexed composite image stream that includes a first image stream polarized at a first orientation and a second image stream polarized at a second orientation orthogonal to the first orientation that are concurrently projected on a display surface, the viewing apparatus comprising:

a first switchable optical rotator receiving the composite image stream and, based on an energized state, either rotating the first and second image streams by about 90 degrees or passing the first and second image streams without rotation;

a first polarization filter adjacent the first switchable optical rotator aligned to pass the first image stream when the first switchable optical rotator rotates the first and second image streams and to pass the second image stream when the first switchable optical rotator passes the first and second image streams without rotation;

a second switchable optical rotator, based on an energized state, selectively rotating the passed one of the first and second image streams; and a second polarization filter adjacent the second switchable optical rotator aligned to pass image streams at one of the first and second orientations, wherein operation of the second switchable optical rotator is performed to select one of the time slots.

15. The apparatus of claim 14, wherein the viewing apparatus comprises a left eye portion and a right eye portions and wherein each of the left and right eye portions comprise the first and second switchable optical rotators and the first and second polarization filters.

16. The apparatus of claim 15, wherein the viewing apparatus comprises a pair of shutter glasses and the first and second switchable optical rotators each comprise an LCD element separated by the first polarization filter.

17. The apparatus of claim 16, further comprising a power source selectively operable to separately apply a voltage to the first and second switchable optical rotators, whereby one, both, or neither of the optical rotators may be energized.

18. The apparatus of claim 17, further comprising a controller operable to select the energized state of the first and second optical rotators to select the first or second image stream and to select one of the time slots.

19. The apparatus of claim 14, wherein the energized state of the second switchable optical rotator is synchronized with the composite image stream display to block all but one of the time slots and wherein the energized state of the first switchable optical rotator is steady state to select one of the first and second streams for alignment with the first polarization filter until an operating state change.

* * * * *